W. E. GRIGO & S. VAN DAL.
POISON BAIT FEEDER FOR FRUIT FLIES.
APPLICATION FILED SEPT. 20, 1915.
1,187,426.
Patented June 13, 1916.
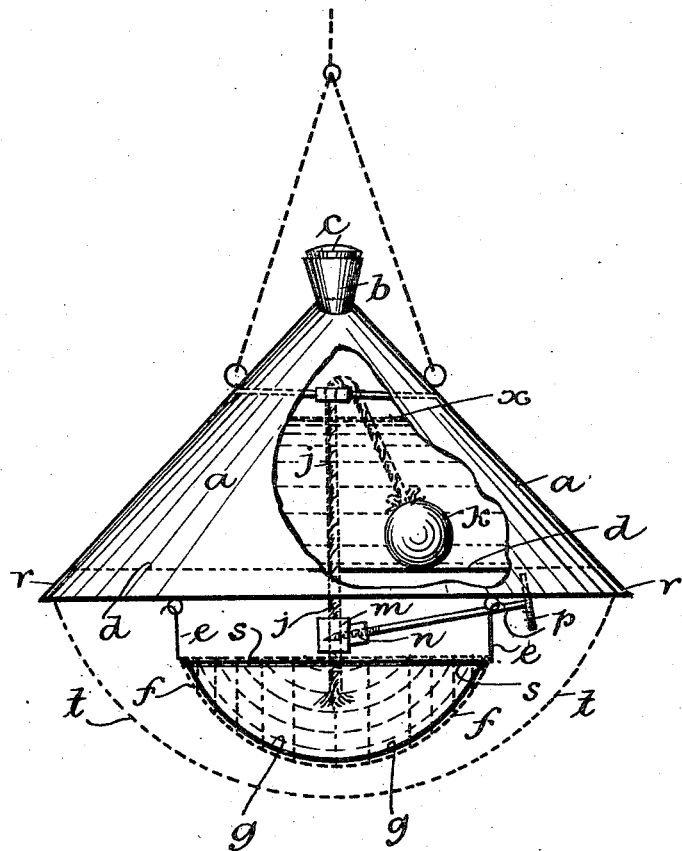

UNITED STATES PATENT OFFICE.

WILLIAM ERNEST GRIGO, OF SUBIACO, AND SIDNEY VAN DAL, OF MADDINGTON, WESTERN AUSTRALIA, AUSTRALIA.

POISON-BAIT FEEDER FOR FRUIT-FLIES.

1,187,426. Specification of Letters Patent. Patented June 13, 1916.

Application filed September 20, 1915. Serial No. 51,704.

*To all whom it may concern:*

Be it known that we, WILLIAM ERNEST GRIGO and SIDNEY VAN DAL, both subjects of the King of Great Britain, and residing at Subiaco and Maddington, respectively, in Western Australia, Commonwealth of Australia, have invented certain new and useful Improvements in Poison-Bait Feeders for Fruit-Flies, of which the following is a specification.

The object of our invention is to provide an effective poison bait feeder principally for fruit flies but our invention is also applicable for the destruction of other flies and insect pests in general.

The invention embodies means for a continuous replenishment of the poisoned bait to maintain it in an "ever fresh" condition notwithstanding loss by evaporation or consumption.

The use and construction of the invention will be explained with the aid of the attached drawing which shows the feeder as in position for use.

The feeder comprises an upper reservoir preferably of a circular and conical shape as $a$ and at its apex it has a feed inlet $b$ which is closable by a cork or stopper as $c$. This reservoir $a$ contains the fruit juice or other such like sweet solution or liquid as $x$ and which acts as the replenishing agent for the poison bait. From the bottom $d$ of this reservoir is suspended by the links or rods $e$ the "feeder" proper as $f$ and which is composed of fine wire gauze or mesh and of approximately a semi-circular shape and having an inside and removable wall of blotting paper or such like absorbent material as $g$ and which latter by its outer surface acts as the "feeding" ground for the flies. This meshed feeder or basket $f$ is filled with a mixture of sand or crushed charcoal and which is impregnated with any approved poison bait by its being dipped therein and which bait by one dipping will prove effective for say twelve months under ordinary conditions. This bait is fed or replenished with fruit juice from the upper reservoir $a$ by the wick $j$ leading from a bag $k$ immersed in the fruit juice, said bag being filled with crushed charcoal.

The volume of the "feed" of the fruit juice passes through an intercepter chamber $m$, said chamber being controlled by a needle valve $n$ and operated by a wheel handle and rod $p$. The roof of the reservoir as at $r$ overhangs the "feeder" proper so as to protect latter from weather or sun and rain conditions. The "feeder" proper has a lid or protector $s$ to prevent evaporation of the bait.

An auxiliary or outer meshed wall is placed at $t$ concentrically with the bait basket $f$ and which wall may be used to exclude certain insects such as bees and which exclusion may in some cases be desirable. The feeder as a whole is suspended by rods and hooks $u$ when in use so as to permit of the free movement of the "feeder" as in a swinging manner underneath the tree or other anchorage.

It will be seen that the poison bait is continuously replenished and maintained in an "ever fresh" condition (from the fruit juice in the reservoir $a$) for its effectiveness in enticing and attracting the victims namely the flies mentioned.

What we claim as our invention and desire to secure by Letters Patent is—

1. An insect exterminator comprising a reservoir for containing bait, a basket of mesh nature suspended from the reservoir for containing a poison element and having an absorbent wall providing a feeding ground for the insects, a wick for feeding the bait from the reservoir to the poison element in said basket, an intercepting chamber through which said wick passes, and a needle valve for controlling the feed of bait to said basket.

2. An insect exterminator comprising a reservoir for containing bait, a basket of mesh nature suspended from the reservoir for containing a poison element and having an absorbent wall providing a feeding ground for the insects, a wick for feeding the bait from the reservoir to the poison element in said basket, and supply controlling means through which said wick passes.

3. An insect exterminator comprising a reservoir for containing bait, a basket of mesh nature suspended from the reservoir for containing a poison element and having an absorbent wall providing a feeding ground for the insects, a wick for feeding the bait from the reservoir to the poison element in said basket, and an auxiliary wall surrounding said basket for excluding certain insects from the latter.

In testimony whereof we have hereunto set our hands in presence of two subscribing witnesses.

WILLIAM ERNEST GRIGO.
SIDNEY VAN DAL.

Witnesses:
RICHARD SPARROW,
U. W. BURKE.

Copies of this patent may be obtained for five cents each, by addressing the "Commissioner of Patents, Washington, D. C."